United States Patent
Kim et al.

(10) Patent No.: US 11,295,106 B2
(45) Date of Patent: Apr. 5, 2022

(54) DISPLAY DEVICE AND DRIVING METHOD THEREOF

(71) Applicant: Samsung Display Co., Ltd., Yongin-si (KR)

(72) Inventors: JeonKyoo Kim, Seoul (KR); MyungWoo Lee, Cheonan-si (KR); Geunjeong Park, Hwaseong-si (KR); Chaehee Park, Suwon-si (KR); Bitna Lee, Yongin-si (KR); Manseung Cho, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/891,582

(22) Filed: Jun. 3, 2020

(65) Prior Publication Data

US 2021/0064834 A1  Mar. 4, 2021

(30) Foreign Application Priority Data

Aug. 29, 2019  (KR) .......................... 10-2019-0106775

(51) Int. Cl.
*G06K 9/00* (2006.01)
*G06F 3/044* (2006.01)
*G06F 3/041* (2006.01)

(52) U.S. Cl.
CPC ........... *G06K 9/0002* (2013.01); *G06F 3/044* (2013.01); *G06F 3/0412* (2013.01); *G06F 3/04166* (2019.05); *G06F 3/041662* (2019.05); *G06K 9/0004* (2013.01)

(58) Field of Classification Search
CPC .............. G06K 9/0002; G06K 9/0004; G06F 3/04166; G06F 3/0412; G06F 3/044; G06F 3/041662
See application file for complete search history.

(56) References Cited

U.S. PATENT DOCUMENTS

| 9,904,404 B2 | 2/2018 | Kang et al. |
| 10,452,937 B2 | 10/2019 | Jin et al. |
| 2011/0157068 A1* | 6/2011 | Parker ............... G06F 3/041661 345/174 |

(Continued)

FOREIGN PATENT DOCUMENTS

| KR | 10-2016-0071887 A | 6/2016 |
| KR | 10-1764014 B1 | 8/2017 |

(Continued)

*Primary Examiner* — Premal R Patel
(74) *Attorney, Agent, or Firm* — Lewis Roca Rothgerber Christie LLP

(57) ABSTRACT

A display device includes a display panel configured to be driven in an initial mode or in a main mode; an input sensing part on the display panel and configured to be driven in a mutual sensing mode or in a self-sensing mode; a fingerprint sensing part below the display panel; and a control module configured to control operations of the display panel, the input sensing part, and the fingerprint sensing part. The display panel is between the fingerprint sensing part and the input sensing part. When the display panel is driven in the initial mode, the control module drives the input sensing part in the self-sensing mode and controls the fingerprint sensing part to detect a fingerprint touched on the input sensing part.

7 Claims, 15 Drawing Sheets

(56) References Cited

U.S. PATENT DOCUMENTS

| | | | | |
|---|---|---|---|---|
| 2015/0286268 A1* | 10/2015 | Komatsu | ............. | G06F 3/04184 |
| | | | | 345/173 |
| 2016/0162011 A1* | 6/2016 | Verma | ............... | G06F 3/041661 |
| | | | | 345/173 |
| 2016/0171281 A1* | 6/2016 | Park | ........................ | G06F 21/32 |
| | | | | 382/124 |
| 2017/0011252 A1* | 1/2017 | Yang | ........................ | A61B 8/54 |
| 2018/0012069 A1* | 1/2018 | Chung | ................. | G06K 9/2036 |
| 2018/0122863 A1* | 5/2018 | Bok | .................... | H01L 27/3225 |
| 2018/0129853 A1* | 5/2018 | Lee | ..................... | G06F 3/04842 |
| 2020/0210065 A1* | 7/2020 | Chen | ................. | G06K 9/2081 |
| 2020/0226404 A1* | 7/2020 | Wu | ....................... | G06K 9/0004 |
| 2020/0242325 A1* | 7/2020 | Hashimoto | .......... | G06K 9/2054 |
| 2021/0056333 A1* | 2/2021 | Cheng | ................. | G06K 9/0004 |

FOREIGN PATENT DOCUMENTS

| | | |
|---|---|---|
| KR | 10-2017-0141522 A | 12/2017 |
| KR | 10-2018-0005588 A | 1/2018 |

\* cited by examiner

DISPLAY DEVICE AND DRIVING METHOD THEREOF

CROSS-REFERENCE TO RELATED APPLICATION

This application claims priority to and the benefit of Korean Patent Application No. 10-2019-0106775 filed on Aug. 29, 2019, in the Korean Intellectual Property Office, the entire disclosure of which is incorporated herein by reference.

BACKGROUND

1. Field

The present disclosure relates to a display device and a driving method thereof.

2. Related Art

Electronic products, such as smart phones, digital cameras, laptop computers, navigation systems, and smart televisions, include a display device for displaying an image. The display device includes a display panel for generating an image, an input apparatus such as an input sensing part, and an authentication apparatus such as a fingerprint sensing part.

The input sensing part is on the display panel and detects a user's touch. A signal detected in the input sensing part is converted into an input signal. The display panel provides users with an image that corresponds to the input signal of the input sensing part.

The fingerprint sensing part detects fingerprints of a finger touched on the input sensing part. The display device compares stored fingerprints of a user with the fingerprints detected by the fingerprint sensing part. The display panel may be driven in normal mode when the detected fingerprints coincide with the stored fingerprints.

SUMMARY

Some example embodiments of the present disclosure provide a display device capable of reducing power consumption and a driving method thereof.

According to some example embodiments of the present disclosure, a display device may include: a display panel configured to be driven in an initial mode or in a main mode; an input sensing part on the display panel configured to be driven in a mutual sensing mode or in a self-sensing mode; a fingerprint sensing part below the display panel; and a control module configured to control operations of the display panel, the input sensing part, and the fingerprint sensing part. The display panel is between the fingerprint sensing part and the input sensing part. When the display panel is driven in the initial mode, the control module may drive the input sensing part in the self-sensing mode and may activate the fingerprint sensing part to detect a fingerprint touched on the input sensing part.

When the input sensing part detects a touch of the fingerprint, the control module may activate the fingerprint sensing part to detect the fingerprint.

The control module may calculate position information of the fingerprint based on touch information of the fingerprint provided from the input sensing part. The control module may drive a portion of the fingerprint sensing part based on the position information of the fingerprint. The portion of the fingerprint sensing part may overlap the fingerprint.

The fingerprint sensing part may include: a plurality of sensing units arranged in a plurality of rows and in a plurality of columns; and a plurality of lines connected to the sensing units. Each line of the plurality of lines may be connected to sensing units arranged in a corresponding row. The control module may apply driving signals to a first group of the plurality of lines that are connected to a first group of sensing units that overlap the fingerprint.

The fingerprint sensing part may further include a plurality of common lines connected to the lines. A second group of the plurality of lines may be connected in common to a corresponding common line. The second group of lines may be connected to a second group of sensing units arranged in h number of rows. The h may be a natural number equal to or greater than 2.

Based on the position information of the fingerprint, the control module may drive a first part of the display panel and may not drive a second part of the display panel. The first part may overlap the fingerprint. The second part may be around the first part.

The fingerprint may comprise a plurality of fingerprints, and the fingerprint sensing part may detect the plurality of fingerprints.

The input sensing part may include: a first sensing electrode; and a second sensing electrode that is insulated from the first sensing electrode and crosses the first sensing electrode. When the input sensing part is driven in the self-sensing mode, the control module may operate the first sensing electrode as a driving electrode and as a sensing electrode. When the input sensing part is driven in the mutual sensing mode, the control module may operate the first sensing electrode as the driving electrode and may operate the second sensing electrode as the sensing electrode.

The fingerprint sensing part may include an optical sensor or a supersonic sensor.

When a detected fingerprint is coincident with a user's fingerprint, the control module may drive the display panel in the main mode and may drive the input sensing part in the mutual sensing mode.

The control module may include: a main controller to output first control signals, second control signals, third control signals, fourth control signals, and fifth control signals; a display panel controller configured to drive the display panel in the initial mode in response to the first control signal and to drive the display panel in the main mode in response to the second control signal; an input sensing controller to drive the input sensing part in the self-sensing mode in response to the third control signal and to drive the input sensing part in the mutual sensing mode in response to the fourth control signal; and a fingerprint sensing controller to activate the fingerprint sensing part in response to the fifth control signal and to provide the main controller with the detected fingerprint. The main controller may compare the detected fingerprint with the user's fingerprint.

When the main controller is turned on, the main controller may output the first and third control signals. When the input sensing part is driven in the self-sensing mode and detects a touch of the fingerprint, the input sensing controller may calculate position information of the fingerprint, based on touch information of the fingerprint provided from the input sensing part, and may provide the main controller with the position information. The main controller may output the fifth control signal in response to the position information.

In response to determining that the detected fingerprint is coincident with the user's fingerprint, the main controller may output the second and fourth control signals.

According to some example embodiments of the present disclosure, a driving method of a display device may include: driving a display panel in an initial mode; driving an input sensing part in a self-sensing mode; detecting a touch of a fingerprint by the input sensing part; controlling a fingerprint sensing part to detect the fingerprint; driving the display panel in a main mode in response to determining that a detected fingerprint is coincident with a user's fingerprint; and driving the input sensing part in a mutual sensing mode.

Detecting the touch of the fingerprint may include calculating position information of the fingerprint based on touch information of the fingerprint. Controlling the fingerprint sensing part may include driving a portion of the fingerprint sensing part based on the position information of the fingerprint. The portion of the fingerprint sensing part may overlap the fingerprint.

The fingerprint sensing part may include: a plurality of sensing units arranged in a plurality of rows and in a plurality of columns; and a plurality of lines connected to the sensing units. Each line of the plurality of lines may be connected to sensing units arranged in a corresponding row. Driving the portion of the fingerprint sensing part may include applying a plurality of driving signals to a first group of the plurality of lines that are connected to a first group of sensing units that overlap the fingerprint.

The fingerprint sensing part may further include a plurality of common lines connected to the lines. A second group of the plurality of lines may be connected in common to a corresponding common line. The second group of lines may be connected to a second group of sensing units arranged in h number of rows, wherein h may be a natural number equal to or greater than 2.

The driving method may further include, based on the position information of the fingerprint, driving a first part of the display panel and not driving a second part of the display panel. The first part may overlap the fingerprint. The second part may be around the first part.

Detecting the fingerprint may include detecting a plurality of fingerprints.

The input sensing part may include: a first sensing electrode; and a second sensing electrode that is insulated from the first sensing electrode and crosses the first sensing electrode. When the input sensing part is driven in the self-sensing mode, the first sensing electrode may be operated as a driving electrode and as a sensing electrode. When the input sensing part is driven in the mutual sensing mode, the first sensing electrode may be operated as the driving electrode and the second sensing electrode may be operated as the sensing electrode.

The fingerprint sensing part may include an optical sensor or a supersonic sensor.

BRIEF DESCRIPTION OF THE DRAWINGS

The accompanying drawings, together with the specification, illustrate embodiments of the subject matter of the present disclosure, and, together with the description, serve to explain principles of embodiments of the subject matter of the present disclosure.

DETAILED DESCRIPTION

Figure 1:
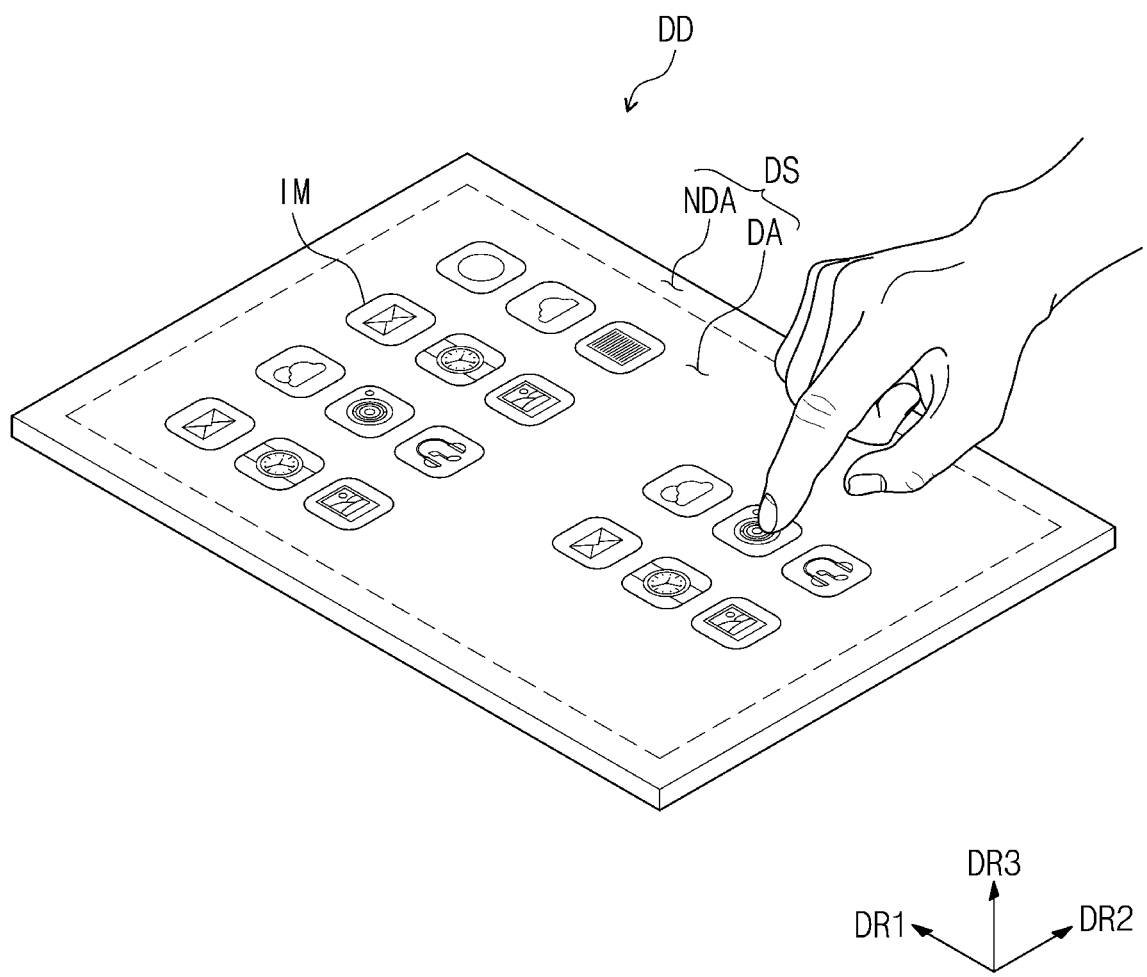
FIG. 1 illustrates a perspective view showing a display device according to some example embodiments of the present disclosure.

In the present disclosure, when a certain component (or region, layer, portion, etc.) is referred to as being "on", "connected to", or "coupled to" other component(s), the certain component may be directly on, directly connected to, or directly coupled to the other component(s) or at least one intervening component may be present therebetween.

Like reference numerals and reference symbols indicate like components.

Moreover, in the drawings, thicknesses, ratios, and dimensions of components are exaggerated for effectively explaining the technical contents.

The term "and/or" includes any and all combinations of one or more of the associated listed items.

It will be understood that, although the terms first, second, etc. may be used herein to describe various components, these components should not be limited by these terms. These terms are only used to distinguish one component from another component. For example, a first component could be termed a second component, and vice versa without departing from the scope of the present disclosure. Unless the context clearly indicates otherwise, the singular form is intended to include the plural forms as well.

In addition, the terms "beneath", "lower", "above", "upper", and the like are used herein to describe one component's relationship to other component(s), as illustrated in the drawings. The spatially relative terms are intended to encompass different orientations, in addition to the orientation depicted in the drawings.

Unless otherwise defined, all terms used herein (including technical and scientific terms) have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

It will be understood that the terms "comprise", "include", "have", and the like are used to specify the presence of stated features, integers, steps, operations, components, elements, or combinations thereof, but do not preclude the presence or addition of one or more other features, integers, steps, operations, components, elements, or combinations thereof.

Some example embodiments of the present disclosure will now be described in more detail in conjunction with the accompanying drawings.

FIG. 1 illustrates a perspective view showing a display device according to some example embodiments of the present disclosure.

Referring to FIG. 1, a display device DD according to some embodiments of the present disclosure may have a rectangular shape with long sides that extend in a first direction DR1 and short sides that extend in a second direction DR2 intersecting the first direction DR1. However, embodiments of the present disclosure are not limited thereto, and the display device DD may have any suitable shape, such as a circular shape or a polygonal shape.

A third direction DR3 is defined as a direction that substantially vertically intersects a plane defined by the first and second directions DR1 and DR2. For example, the third direction DR3 may be perpendicular or substantially perpendicular to the plane defined by the first and second directions DR1 and DR2.

The display device DD may have a top surface that includes (e.g., that is) a display surface DS, and the top surface may have (e.g., may be in) a plane defined by the first and second directions DR1 and DR2. The display surface DS may provide users with images IM generated from the display device DD.

The display surface DS may include a display area DA and a non-display area NDA around the display area DA. The display area DA may display the images IM, but the non-display area NDA may not display the images IM. The non-display area NDA may surround the display area DA and may provide the display device DD with an edge printed with (e.g., an edge having) a certain color.

In some embodiments, the display device DD may be used for large-sized electronic products, such as televisions, monitors, or outdoor billboards. In some embodiments, the display device DD may be used for small and medium-sized electronic products, such as personal computers, laptop computers, personal digital terminals, automotive navigation systems, game consoles, smart phones, tablet computers, or cameras. However, embodiments of the present disclosure are not limited thereto, and the display device DD may be used for any suitable electronic product without departing from the present disclosure.

Figure 2:
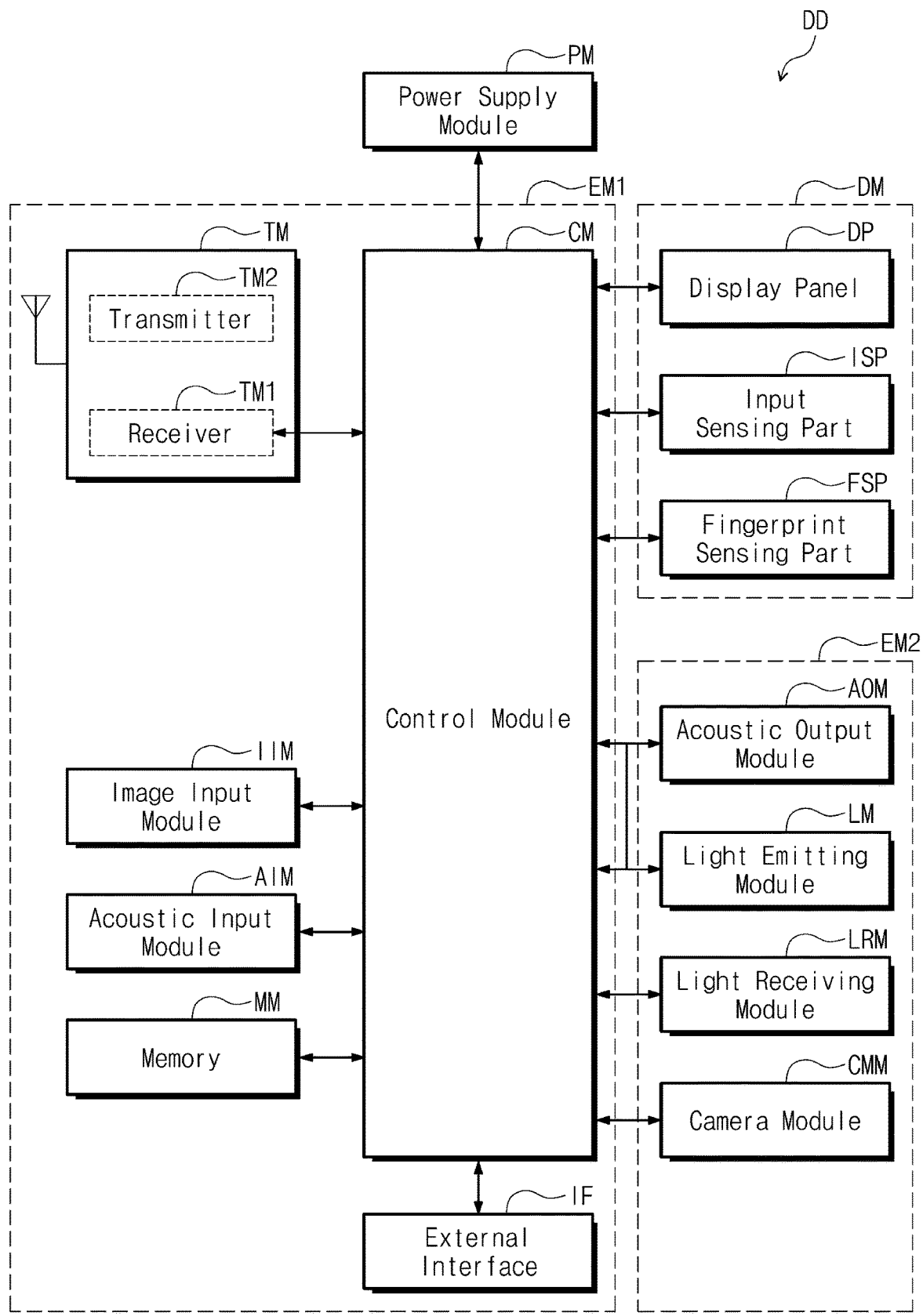
FIG. 2 illustrates a block diagram showing the display device of FIG. 1.

FIG. 2 illustrates a block diagram showing the display device of FIG. 1.

Referring to FIG. 2, the display device DD may include a display module DM, a power supply module PM, a first electronic module EM1, and a second electronic module EM2. The display module DM, the power supply module PM, the first electronic module EM1, and the second electronic module EM2 may be electrically connected to each other.

The power supply module PM may supply power required for overall operation of the display device DD. The power supply module PM may include any suitable battery module.

The first electronic module EM1 and the second electronic module EM2 may include diverse functional modules for operating the display device DD. The first electronic module EM1 may be directly mounted on a motherboard that is electrically connected to the display module DM, or the first electronic module EM1 may be mounted on a separate board that is electrically connected to the motherboard through connectors or the like.

The first electronic module EM1 may include a control module CM, a wireless communication module TM, an image input module IIM, an acoustic input module AIM, a memory MM, and an external interface IF. One or more of the modules (e.g., one or more of the modules included in the first electronic module EM1) may be electrically connected through a flexible circuit board to the motherboard instead of being mounted on the motherboard.

The control module CM may control an overall operation of the display device DD. The control module CM may activate or deactivate the display module DM. Based on touch signals received from the display module DM, the control module CM may control other modules such as the image input module IIM and the acoustic input module AIM. In addition, the control module CM may use fingerprint information received from the display module DM and may thereby accomplish (e.g., may thereby operate in) a user authentication mode. As used herein, the terms "use" and "utilize" may be synonymous.

The wireless communication module TM may use Bluetooth and/or WiFi communication to transceive wireless signals with other terminals. As used herein, the term "transceive" may mean to transmit and/or receive. The wireless communication module TM may use a general communication system to transceive speech signals. The wireless communication module TM may include a transmitter TM2 that modulates and transmits signals to be transferred (e.g., to be transmitted) and a receiver TM1 that demodulates received signals.

The image input module IIM may process and convert image signals into image data capable of being displayed (e.g., capable of being utilized to display an image IM) on the display module DM. The acoustic input module AIM may receive external sound signals through a microphone in record mode or in speech recognition mode and may convert the received sound signals into electrical voice data.

The external interface IF may serve as an interface connected to, for example, an external charger, a wire/wireless data port, or a card socket (e.g., a memory card or an SIM/UIM card).

The second electronic module EM2 may include an acoustic output module AOM, a light-emitting module LM, a light-receiving module LRM, and a camera module CMM. The components mentioned above (e.g., the modules included in the second electronic module EM2) may be directly mounted on a motherboard, may be mounted on a separate board and electrically connected through connectors or the like to the display module DM, or may be electrically connected to the first electronic module EM1.

The acoustic output module AOM may convert and output sound data that is received from the wireless communication module TM or that is stored in the memory MM. The light-emitting module LM may generate and output light.

The light-emitting module LM may output an infrared ray (e.g., infrared light). The light-emitting module LM may include a light-emitting diode (LED) element. The light-receiving module LRM may sense an infrared ray. The light-receiving module LRM may be activated upon detecting an infrared ray at a certain level or higher. For example, the light-receiving module LRM may activate when it senses an infrared ray having a certain energy or intensity level or higher. The light-receiving module LRM may include a complementary metal oxide semiconductor (CMOS) sensor.

After the light-emitting module LM generates and outputs the infrared ray, the infrared ray may be reflected from an external surface or object (e.g., the user's fingers or face), and the light-receiving module LRM may receive the reflected infrared ray. The camera module CMM may capture an external image.

The display module DM may include a display panel DP, an input sensing part ISP, and a fingerprint sensing part FSP. In some embodiments, the display module DM may include a window.

The display panel DP may use image data provided from (e.g., received from) the control module CM to display images. The control module CM may control the display panel DP to operate in an initial mode and a main mode next to or following the initial mode (e.g., after the initial mode).

The initial mode may be a user authentication mode. When (e.g., after) a user is authenticated in the initial mode, the control module CM may drive the display panel DP in the main mode. In the main mode, the display panel DP may display various images that the user can view. The user authentication may be accomplished by fingerprint authentication, passcode authentication, face recognition authentication, or any other suitable means of authenticating the user. Fingerprint authentication will be discussed below in more detail.

The input sensing part ISP may detect external inputs (e.g., the user's hand, a touch pen, etc.), and detected signals may be converted into input signals and then may be transmitted to the control module CM. In response to the input signals from the input sensing part ISP, the control module CM may control operations of the display panel DP and the fingerprint sensing part FSP.

The input sensing part ISP may include a plurality of sensing electrodes for detecting external inputs. The sensing electrodes may use a capacitive type method to detect external inputs. The input sensing part ISP may be driven in a self-sensing mode or in a mutual sensing mode. The self-sensing mode and the mutual sensing mode will be discussed below in more detail.

When the display panel DP is driven in the initial mode, the fingerprint sensing part FSP may detect a fingerprint in close proximity to, or in contact with, the display module DM. As used herein, "fingerprint" may mean the surface of a fingertip. The control module CM may receive information about the fingerprint detected by the fingerprint sensing part FSP.

The control module CM may compare the detected fingerprint information with the user's fingerprint information stored in the control module CM. When the detected fingerprint information is coincident with (e.g., matches, substantially matches, or corresponds to) the user's fingerprint information, the control module CM may drive the display panel DP to convert the initial mode into the main mode.

Figure 3:
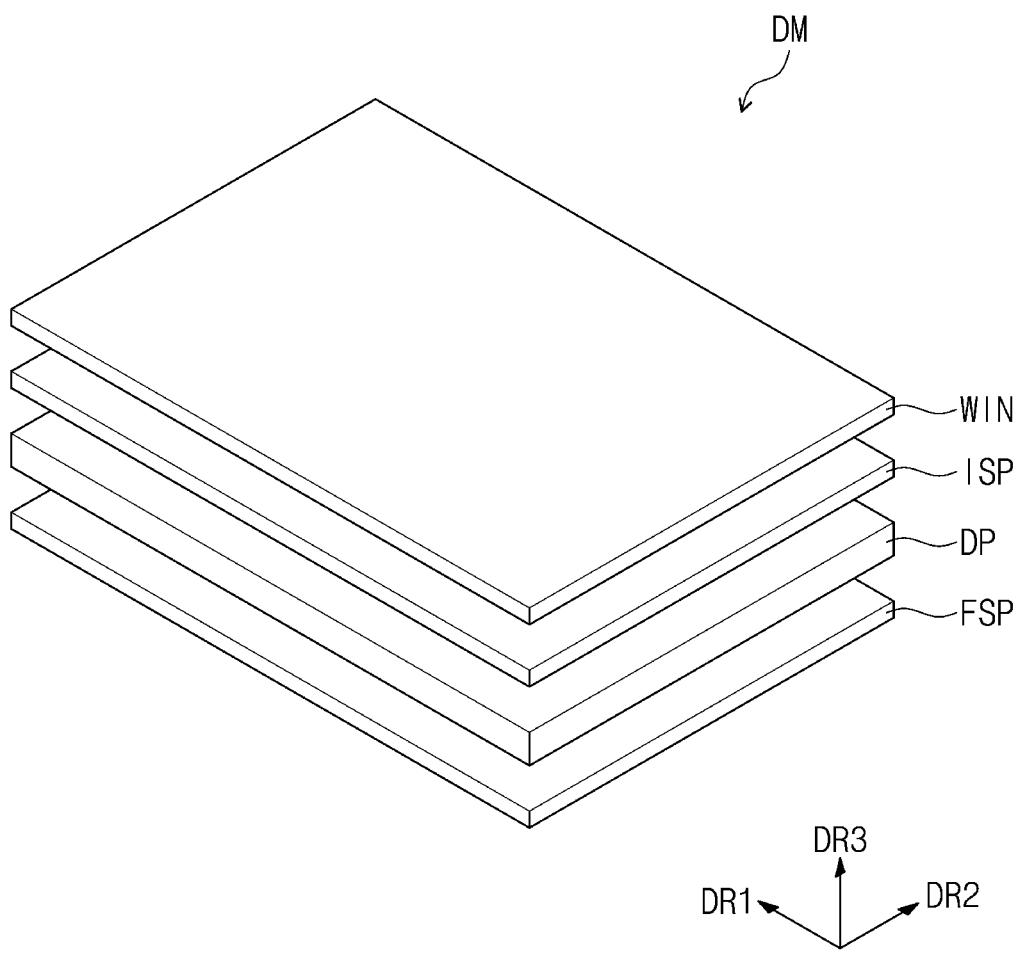
FIG. 3 illustrates an exploded perspective view showing a display module of FIG. 2.

FIG. 3 illustrates an exploded perspective view showing the display module of FIG. 2.

Referring to FIG. 3, the input sensing part ISP may be on the display panel DP, and a window WIN may be on the input sensing part ISP. The fingerprint sensing part FSP may be below the display panel DP.

The display panel DP according to some embodiments of the present disclosure may be, but is not limited to, an emissive type display panel. For example, the display panel DP may be an organic light emitting display panel or a quantum-dot light emitting display panel. An emission layer of the organic light emitting display panel may include an organic light-emitting material. An emission layer of the quantum-dot light emitting display panel may include a quantum-dot or a quantum-rod. An example in which the display panel DP is an organic light emitting display panel with be described below.

The window WIN may protect the display panel DP and the input sensing part ISP against external scratches and impact. The window WIN may be attached through an adhesive to the input sensing part ISP. The adhesive may include an optically clear adhesive, a pressure sensitive adhesive, or any other suitable adhesive. An image generated from the display panel DP (e.g., by the display panel DP) may pass through the window WIN and then may be provided to users.

The input sensing part ISP may be directly on the display panel DP. In some embodiments, when the display module DM is manufactured, the input sensing part ISP may be fabricated directly on the display panel DP. However, embodiments of the present disclosure are not limited thereto. For example, the input sensing part ISP may be an input sensing panel that is attached to the display panel DP through an adhesive. In some embodiments, when the display module DM is manufactured, the input sensing part ISP is separately fabricated as an input sensing panel and then attached to the display panel through an adhesive.

The fingerprint sensing part FSP may be entirely below the display panel DP. However, embodiments of the present disclosure are not limited thereto, and the fingerprint sensing part FSP may be locally (e.g., only partially) below the display panel DP. For example, in some embodiments, the fingerprint sensing part FSP is below the display panel DP and entirely overlaps the display panel DP. In some embodiments, the fingerprint sensing part FSP is below the display panel DP and overlaps only a portion of the display panel DP.

Figure 4:
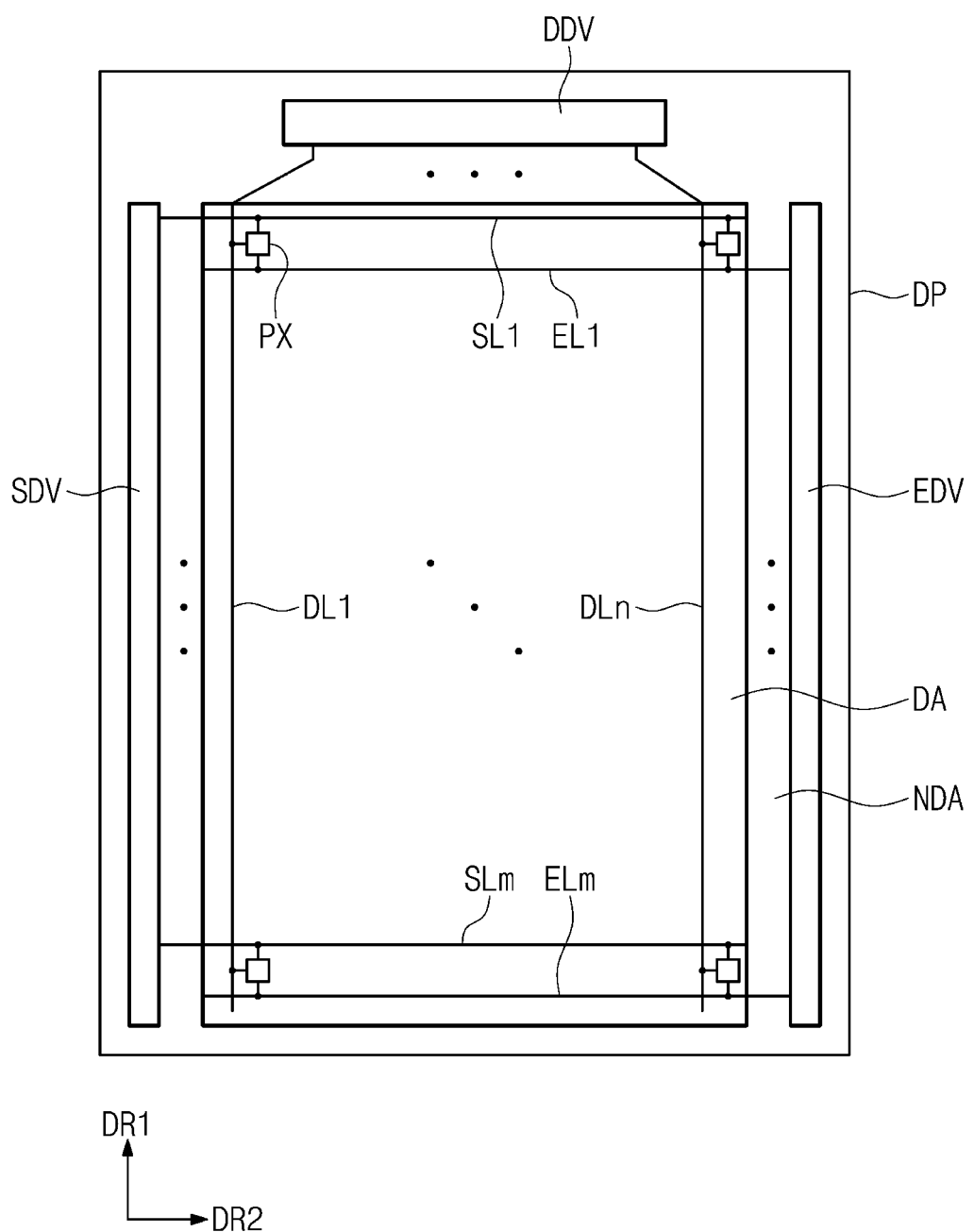
FIG. 4 illustrates a plan view showing a display panel of FIG. 3.

FIG. 4 illustrates a plan view showing the display panel DP depicted in FIG. 3.

Referring to FIG. 4, the display device DD may include the display panel DP, a scan driver SDV, a data driver DDV, and an emission driver EDV.

The display panel DP may be a flexible display panel. For example, the display panel DP may include a plurality of electronic elements on a flexible substrate. The display panel DP may have a rectangular shape with long sides that extend in the first direction DR1 and short sides that extend in the second direction DR2. Like the display surface DS of the display device DD, the display panel DP may include a display area DA and a non-display area NDA that surrounds the display area DA. In some embodiments, the display area DA and the non-display area NDA of the display panel DP may correspond to (e.g., may be the same as, may overlap, or may substantially overlap) the display area DA and the non-display area NDA of the display surface DS, respectively.

The display panel DP may include a plurality of pixels PX, a plurality of scan lines SL1 to SLm, a plurality of data lines DL1 to DLn, and a plurality of emission lines EL1 to ELm. The subscripts "m" and "n" are natural numbers. The pixels PX may be in the display area DA (e.g., in rows and columns) and may be connected to the scan lines SL1 to SLm, the data lines DL1 to DLn, and the emission lines EL1 to ELm. For example, in some embodiments, the scan lines SL1 to SLm and the emission lines EL1 to ELm are connected to corresponding rows of pixels PX, and the data lines DL1 to DLn are connected to corresponding columns of pixels PX.

The scan driver SDV, the data driver DDV, and the emission driver EDV may be in the non-display area NDA. The scan driver SDV may be in the non-display area NDA adjacent to one of the long sides of the display panel DP. The emission driver EDV may be in the non-display area NDA adjacent to another one of the long sides of the display panel DP. The data driver DDV may be an integrated circuit chip and may be in the non-display area NDA adjacent to one of the short sides of the display panel DP.

The scan lines SL1 to SLm may extend in the second direction DR2 and connect with the scan driver SDV. The data lines DL1 to DLn may extend in the first direction DR1 to connect with the data driver DDV. The emission lines EL1 to ELm may extend in the second direction DR2 and connect with the emission driver EDV.

The scan driver SDV may generate a plurality of scan signals, and the scan signals may be applied through the scan lines SL1 to SLm to the pixels PX. The scan signals may be sequentially applied to the pixels PX. For example, in some embodiments, the scan signals are sequentially supplied to the scan lines SL1 to SLm to apply the scan signals sequentially to the corresponding rows of pixels PX. The data driver DDV may generate a plurality of data voltages, and the data voltages may be applied through the data lines DL1 to DLn to the pixels PX (e.g., the data lines DL1 to DLn may apply data voltages to corresponding columns of pixels PX). The emission driver EDV may generate a plurality of light emission signals, and the light emission signals may be applied through the emission lines EU to ELm to the pixels PX (e.g., the emission lines EL1 to ELm may apply emission signals to corresponding rows of pixels PX).

The control module CM may control operations of the scan driver SDV, the data driver DDV, and the emission driver EDV. The display panel DP may be connected to the control module CM, and the control module CM may provide the scan driver SDV, the data driver DDV, and the emission driver EDV with control signals for respectively controlling operations of the scan driver SDV, the data driver DDV, and the emission driver EDV.

In response to the scan signals, the data voltages may be provided to the pixels PX. In response to the light emission signals, the pixels PX may emit light corresponding to the data voltages, thereby displaying an image. Light emission times of the pixels PX may be controlled by the light emission signals.

Figure 5:
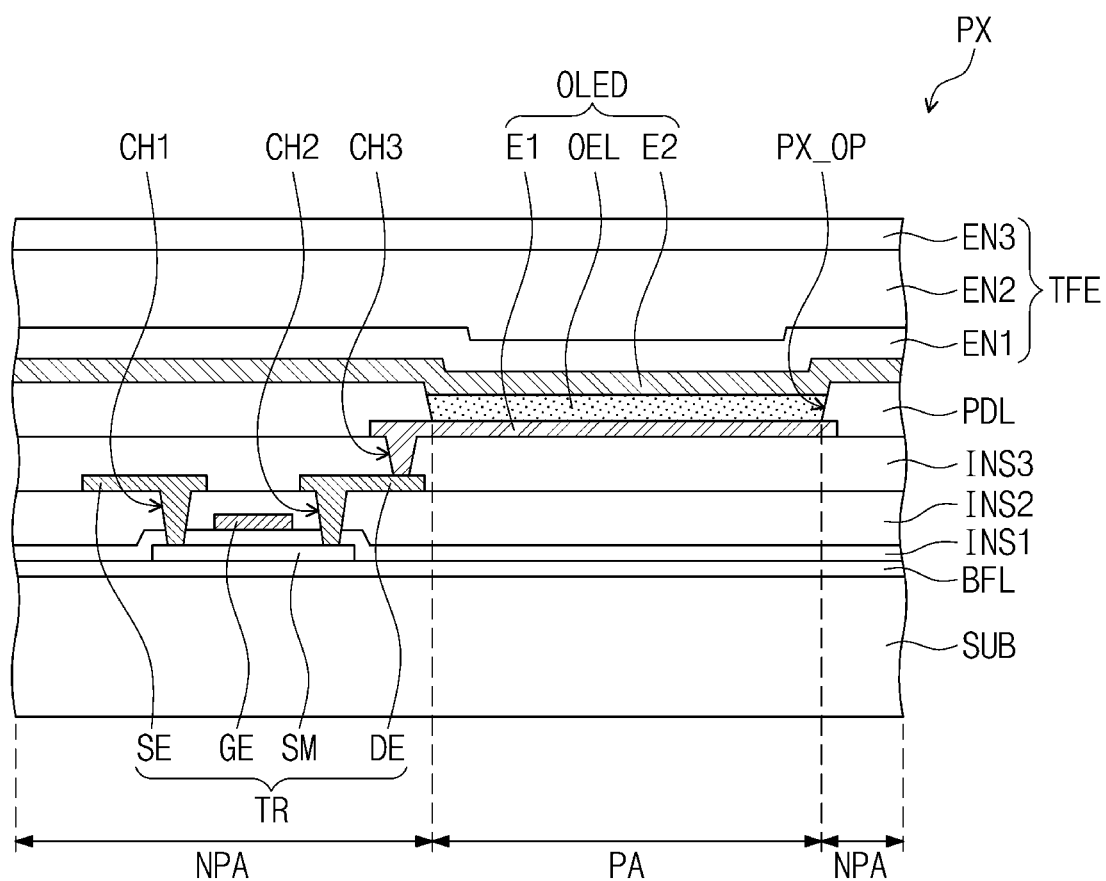
FIG. 5 illustrates a simplified cross-sectional view showing a pixel of FIG. 4.

FIG. 5 illustrates a simplified cross-sectional view showing the pixel of FIG. 4.

Referring to FIG. 5, the pixel PX may include an organic light emitting element OLED and a transistor TR connected to the organic light emitting element OLED. The organic light emitting element OLED may include a first electrode E1, a second electrode E2, and an organic emission layer OEL between the first and second electrodes E1 and E2.

The pixel PX may include a pixel area PA and a non-pixel area NPA around (e.g., adjacent to) the pixel area PA. The organic light emitting element OLED may be in the pixel area PA, and the transistor TR may be in the non-pixel area NPA. The transistor TR and the organic light emitting element OLED may be on a substrate SUB. A buffer layer BFL may be on the substrate SUB, and the buffer layer BFL may include an inorganic material.

The buffer layer BFL may be thereon (e.g., on the substrate SUB) with a semiconductor layer SM of the transistor TR. For example, in some embodiments, the semiconductor layer SM of the transistor TR may be on the buffer layer BFL. The semiconductor layer SM may include an organic semiconductor and/or an inorganic semiconductor such as amorphous silicon and/or polycrystalline silicon. In some embodiments, the semiconductor layer SM may include an oxide semiconductor. In some embodiments, the semiconductor layer SM may include a source region, a drain region, and a channel region between the source and drain regions.

The buffer layer BFL may be thereon (e.g., on the substrate) with a first insulating layer INS1 that covers the semiconductor layer SM. For example, in some embodiments, the first insulating layer INS1 may be on the buffer layer BFL and may cover the semiconductor layer SM. The first insulating layer INS1 may include an inorganic material. The first insulating layer INS1 may be thereon (e.g., on the buffer layer BFL) with a gate electrode GE of the transistor TR, and the gate electrode GE may overlap the semiconductor layer SM. For example, in some embodiments, the gate electrode GE of the transistor TR may be on the first insulating layer INS1. The gate electrode GE may overlap the channel region of the semiconductor layer SM.

The first insulating layer INS1 may be thereon (e.g., on the buffer layer BFL) with a second insulating layer INS2 that covers the gate electrode GE. For example, in some embodiments, the second insulating layer INS2 may be on the first insulating layer INS1 and may cover the gate electrode GE of the transistor TR. The second insulating layer INS2 may be an interlayer dielectric layer. The second insulating layer INS2 may include one or more selected from an organic material and an inorganic material.

A source electrode SE and a drain electrode DE of the transistor TR may be spaced apart from each other on the second insulating layer INS2. The source electrode SE may be connected to the source region of the semiconductor layer SM through a first contact hole CH1 that penetrates the first and second insulating layers INS1 and INS2. The drain electrode DE may be connected to the drain region of the semiconductor layer SM through a second contact hole CH2 that penetrates the first and second insulating layers INS1 and INS2.

The second insulating layer INS2 may be thereon (e.g., on the first insulating layer INS1) with a third insulating layer INS3 that covers the source and drain electrodes SE and DE of the transistor TR. For example, in some embodiments, the third insulating layer INS3 may be on the second insulating layer INS2 and may cover the source and drain electrodes SE and DE of the transistor TR. The third insulating layer INS3 may be a planarized layer (e.g., planarization layer) that provides a flat top surface and may include an organic material.

The first electrode E1 may be on the third insulating layer INS3. The first electrode E1 may be connected to the drain electrode DE of the transistor TR through a third contact hole CH3 that penetrates the third insulating layer INS3. The first electrode E1 may be a pixel electrode. The first electrode E1 may include a transparent electrode or a reflective electrode.

The first electrode E1 and the third insulating layer INS3 may be thereon (e.g., on the second insulating layer INS2) with a pixel definition layer PDL that exposes an exposed portion of the first electrode E1. For example, in some embodiments, the pixel defining layer PDL may be on the third insulating layer INS3 and may cover a covered portion of the first electrode E1. The pixel definition layer PDL may have an opening PX_OP that exposes the portion of the first electrode E1.

The organic emission layer OEL may be on the first electrode E1 and may be in the opening PX_OP. The organic emission layer OEL may generate light of a color selected from one of red, green, and blue. However, embodiments of the present disclosure are not limited thereto, and the organic emission layer OEL may generate white light. In some embodiments, the white light may be generated from a combination of organic materials that emit light of red, green, and blue colors.

The second electrode E2 may be on the pixel definition layer PDL and on the organic emission layer OEL. The second electrode E2 may be a common electrode. The second electrode E2 may include a transparent electrode or a reflective electrode.

The second electrode E2 may be thereon (e.g., on the pixel defining layer PDL and on the organic emission layer OEL) with a thin-film encapsulation layer TFE that covers the organic light emitting element OLED. For example, in some embodiments, the thin-film encapsulation layer TFE may be on the second electrode E2. The thin-film encapsulation layer TFE may include a first encapsulation layer EN1 on the second electrode E2, a second encapsulation layer EN2 on the first encapsulation layer EN1, and a third encapsulation layer EN3 on the second encapsulation layer EN2.

Each of the first and third encapsulation layers EN1 and EN3 may include an inorganic material, and the second encapsulation layer EN2 may include an organic material. The second encapsulation layer EN2 may have a thickness greater than that of each of the first and third encapsulation layers EN1 and EN3.

A first voltage may be applied to the first electrode E1, and a second voltage may be applied to the second electrode E2. Holes and electrons injected into the organic emission layer OEL may combine with each other to produce excitons, and the organic light emitting element OLED may emit light when the excitons return to ground state. The organic light emitting element OLED may emit a red light, a green light, or a blue light based on current flow, thereby displaying an image.

Figure 6:
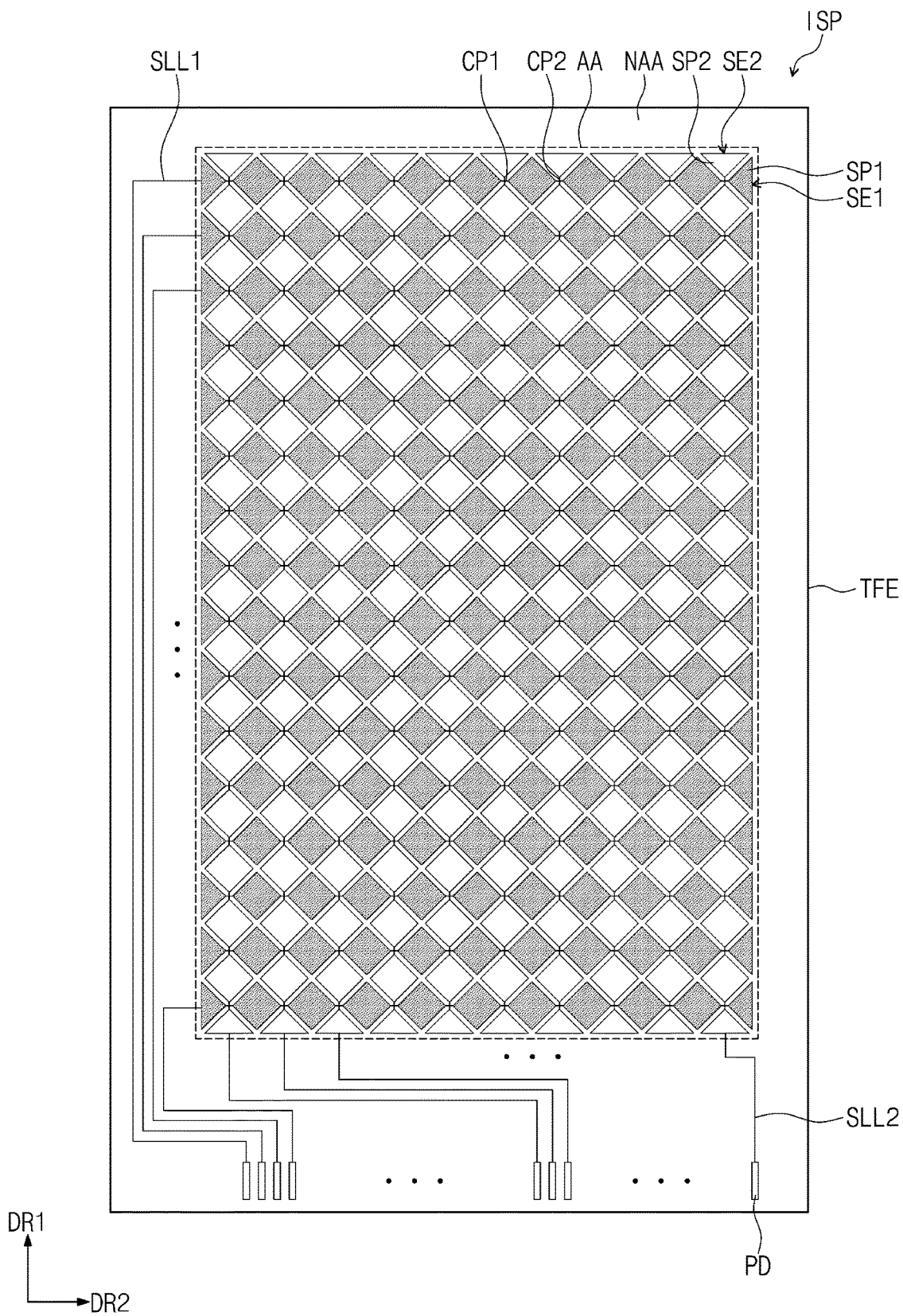
FIG. 6 illustrates a plan view showing an input sensing part of FIG. 3.

FIG. 6 illustrates a plan view showing the input sensing part of FIG. 3.

Referring to FIG. 6, the input sensing part ISP may include a plurality of sensing electrodes SE1 and SE2, a plurality of signal lines SLL1 and SLL2, and a plurality of pads PD. The sensing electrodes SE1 and SE2, the signal lines SLL1 and SLL2, and the pads PD may be on the thin-film encapsulation layer TFE.

The input sensing part ISP may include an active area AA and an inactive area NAA that surrounds the active area AA. The active area AA may overlap the display area DA, and the inactive area NAA may overlap the non-display area NDA. The sensing electrodes SE1 and SE2 may be in the active area AA, and the pads PD may be in the inactive area NAA. The signal lines SLL1 and SLL2 may be connected to the sensing electrodes SE1 and SE2, and may extend along the inactive area NAA to connect with the pads PD.

The plurality of sensing electrodes SE1 and SE2 may include a plurality of first sensing electrodes SE1 that extend in (e.g., that extend in rows along) the second direction DR2 and are arranged in (e.g., are arranged adjacently along) the first direction DR1. The plurality of sensing electrodes SE1 and SE2 may also include a plurality of second sensing electrodes SE2 that extend in (e.g., that extend in rows along) the first direction DR1 and are arranged in (e.g., are arranged adjacently along) the second direction DR2. The plurality of signal lines SLL1 and SLL2 may include a plurality of first signal lines SLL1 connected to the first sensing electrodes SE1 and a plurality of second signal lines SLL2 connected to the second sensing electrodes SE2.

The second sensing electrodes SE2 may extend (e.g., may extend in the first direction DR1) to cross the first sensing electrodes SE1, while being insulated from the first sensing electrodes SE1. The first sensing electrodes SE1 may be input sensing electrodes, and the second sensing electrodes SE2 may be output sensing electrodes.

Capacitance may be formed between the first sensing electrode SE1 and the second sensing electrode SE2. X and Y coordinates may be used to divide positions (e.g., to define positions) of the first and second sensing electrodes SE1 and SE2. The first sensing electrodes SE1 may represent (e.g., may correspond to) X-coordinates, and the second sensing electrodes SE2 may represent (e.g., may correspond to) Y-coordinates.

The input sensing part ISP may be connected to the control module CM and may be driven by the control module CM (e.g., by control of the control module CM). When the control module CM drives the input sensing part ISP in the self-sensing mode, the control module CM may operate the first sensing electrodes SE1 as a driving electrode and as a sensing electrode. For example, the control module CM may apply driving signals through the first signal lines SLL1 to the first sensing electrodes SE1, and may receive sensing signals from the first sensing electrodes SE1. For example, in some embodiments, the control module CM may receive the sensing signals through the first signal lines SLL1 from the first sensing electrodes SE1.

When the control module CM drives the input sensing part ISP in the mutual sensing mode, the control module CM may operate each of the first sensing electrodes SE1 as a driving electrode and may operate each of the second sensing electrodes SE2 as a sensing electrode. For example, the control module CM may apply driving signals through the first signal lines SLL1 to the first sensing electrodes SE1, and may receive sensing signals through the second signal lines SLL2 from the second sensing electrodes SE2.

The first sensing electrodes SE1 may be used in the self-sensing mode, and the first and second sensing electrodes SE1 and SE2 may be used in the mutual sensing mode. Accordingly, when the input sensing part ISP is driven in the self-sensing mode rather than the mutual sensing mode, the input sensing part ISP may consume less power (e.g., compared to when the input sensing part ISP is driven in the mutual sensing mode).

Each of the first sensing electrodes SE1 may include a plurality of first sensor parts SP1 arranged in the second direction DR2 and a plurality of first connection parts CP1 that connect the first sensor parts SP1. The first sensor part SP1 may have a rhombic shape, but the shape of the first sensor part SP1 is not limited thereto. For example, in some embodiments, the first sensor part SP1 may have a rhombic shape with a mesh pattern. Each of the first connection parts CP1 may be between two neighboring first sensor parts SP1 to electrically connect the two first sensor parts SP1.

Each of the second sensing electrodes SE2 may include a plurality of second sensor parts SP2 arranged in the first direction DR1 and a plurality of second connection parts CP2 that connect the second sensor parts SP2. The second sensor part SP2 may have a rhombic shape, but the shape of the second sensor part SP2 is not limited thereto. For example, in some embodiments, the second sensor part SP2 may have a rhombic shape and a mesh pattern. Each of the second connection parts CP2 may be between two neighboring second sensor parts SP2 to electrically connect the two second sensor parts SP2.

The first sensor parts SP1 and the second sensor parts SP2 may be spaced apart from and alternately with each other, while not overlapping each other. The second connection parts CP2 may extend (e.g., may extend in the first direction DR1) to cross the first connection parts CP1, while being insulated from the first connection parts CP1.

The first and second sensor parts SP1 and SP2 and the first connection parts CP1 may be on the same layer. The second connection parts CP2 may be on a different layer from the layer on which the first and second sensor parts SP1 and SP2 and the first connection parts CP1 are on.

Figure 7:
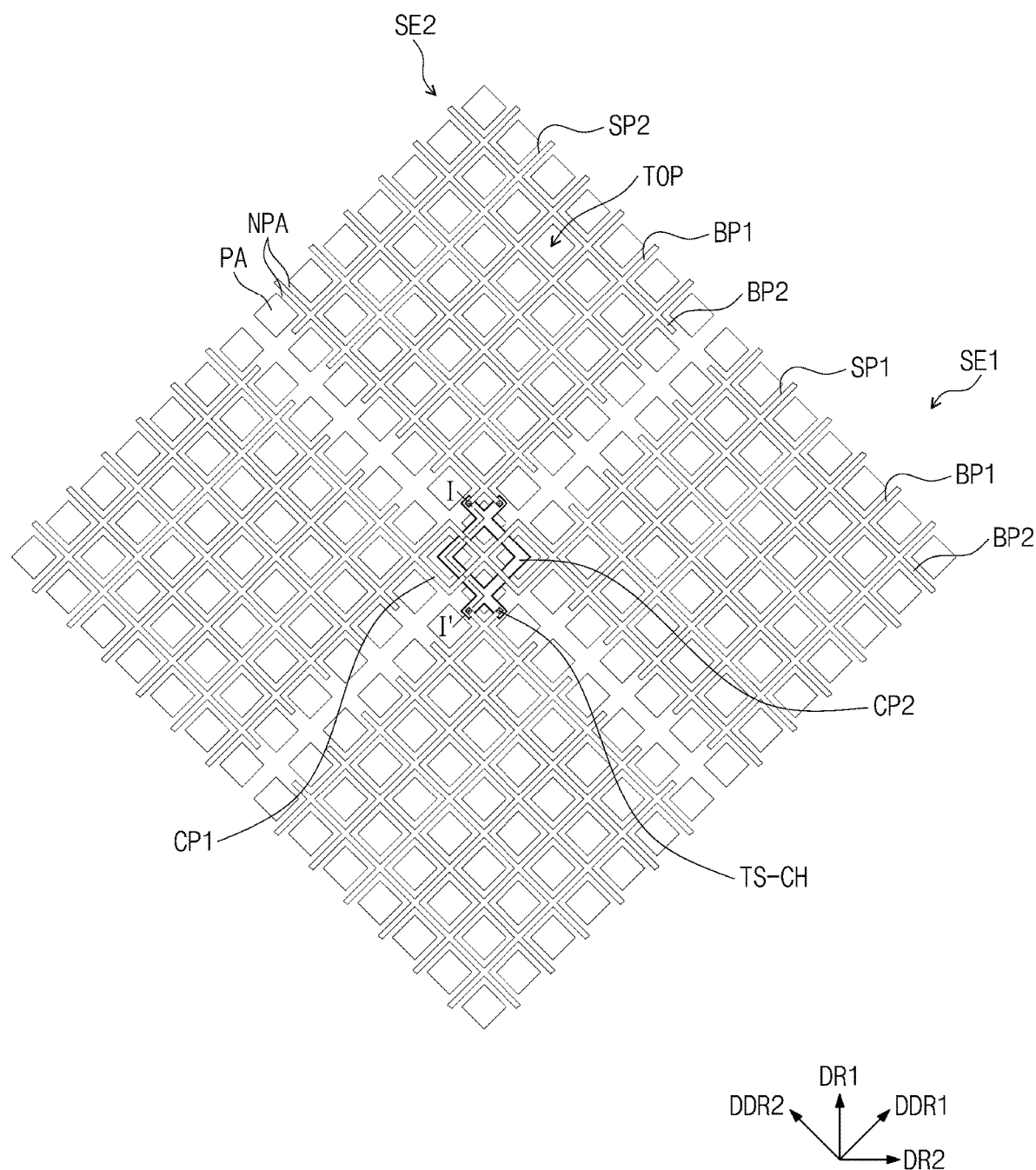
FIG. 7 illustrates a plan view showing first and second sensor parts of FIG. 6.
Figure 8:
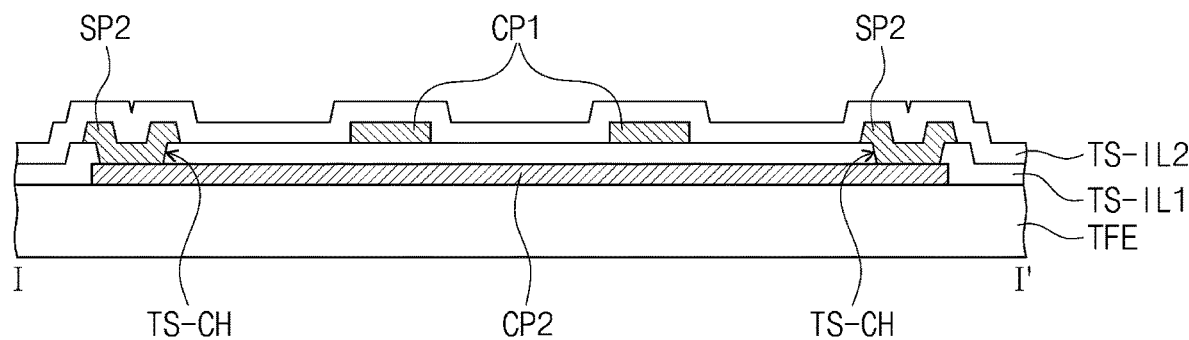
FIG. 8 illustrates a cross-sectional view taken along line I-I' of FIG. 7.

FIG. 7 illustrates a plan view showing the first and second sensor parts of FIG. 6. FIG. 8 illustrates a cross-sectional view taken along line I-I' of FIG. 7.

FIG. 7 exemplarily illustrates two neighboring first sensor parts SP1 and two neighboring second sensor parts SP2.

Referring to FIG. 7, the first and second sensor parts SP1 and SP2 may have a mesh shape. For example, each of the first and second sensor parts SP1 and SP2 may include a plurality of first branches BP1 that extend in a first diagonal direction DDR1 and a plurality of second branches BP2 that extend in a second diagonal direction DDR2.

The first diagonal direction DDR1 may be a direction that intersects the first and second directions DR1 and DR2 on a plane defined by the first and second directions DR1 and DR2. The second diagonal direction DDR2 may be a direction that intersects the first diagonal direction DDR1 on a plane defined by the first and second directions DR1 and DR2. For example, in some embodiments, each of the first diagonal direction DDR1 and the second diagonal direction DDR2 bisect an angle between the first and second directions DR1 and DR2. For example, the first and second directions DR1 and DR2 may vertically intersect each other (e.g., may intersect each other at right angles or may be perpendicular to one another), and the first and second diagonal directions DDR1 and DDR2 may vertically intersect each other (e.g., may intersect each other at right angles or may be perpendicular to one another).

The first and second branches BP1 and BP2 of each of the first and second sensor parts SP1 and SP2 may intersect each other and may be integrated in (e.g., may constitute) a single body. The first and second branches BP1 and BP2 of each of the first and second sensor parts SP1 and SP2 may define rhombic openings TOP. The first and second branches BP1 and BP2 may be defined by mesh lines, and each of the mesh lines may have a line-width of several micrometers.

The pixel area PA may have a rhombic shape, and may overlap the rhombic opening TOP. The first and second branches BP1 and BP2 of each of the first and second sensor parts SP1 and SP2 may overlap the non-pixel area NPA. The pixel areas PA may be emission regions, and the non-pixel area NPA may be a non-emission region. Because the first and second sensor parts SP1 and SP2 are in the non-pixel area NPA, light generated from the pixel areas PA may be normally emitted without being affected by the first and second sensor parts SP1 and SP2.

The first connection part CP1 may connect (e.g., electrically connect) the first sensor parts SP1 to each other. In some embodiments, the first sensor parts SP1 and the first connection part CP1 may be integrated in (e.g., may constitute) a single body. The first connection part CP1 may have a mesh shape and may extend from the first sensor parts SP1.

The second connection part CP2 may electrically connect the second sensor parts SP2 to each other. In some embodiments, the second connection part CP2 is not integrated with the second sensor parts SP2. The second connection part CP2 may be connected to the second sensor parts SP2 through a plurality of contact holes TS-CH.

Referring to FIG. 8, the second connection part CP2 may be on the thin-film encapsulation layer TFE. The thin-film encapsulation layer TFE may be thereon (e.g., on the second electrode E2) with a first dielectric layer TS-IL1 that covers the second connection part CP2. For example, in some embodiments, the first dielectric layer TS-IL1 may be on the thin-film encapsulation layer TFE and may cover at least a portion of the second connection part CP2. The first connection part CP1 and the second sensor parts SP2 may be on the first dielectric layer TS-IL1. The first sensor parts SP1 integrated with the first connection part CP1 may also be on the first dielectric layer TS-IL1. The first dielectric layer TS-IL1 may be thereon (e.g., on the thin-film encapsulation layer TFE) with a second dielectric layer TS-IL2 that covers the first connection part CP1 and the second sensor parts SP2. For example, in some embodiments, the second dielectric layer TS-IL2 may be on the first dielectric layer TS-IL1 and may cover the first connection part CP1 and the second sensor parts SP2.

The second connection part CP2 may be connected to the second sensor parts SP2 through a plurality of contact holes TS-CH that are in the first dielectric layer TS-IL1. The second connection part CP2 may have opposite sides (e.g., regions at opposite sides along a horizontal direction, such as along the first direction DR1 or the second direction DR2) that are connected through the contact holes TS-CH to the second sensor parts SP2.

An additional dielectric layer may be on the thin-film encapsulation layer TFE, and the input sensing part ISP may be on the additional dielectric layer.

Figure 9:
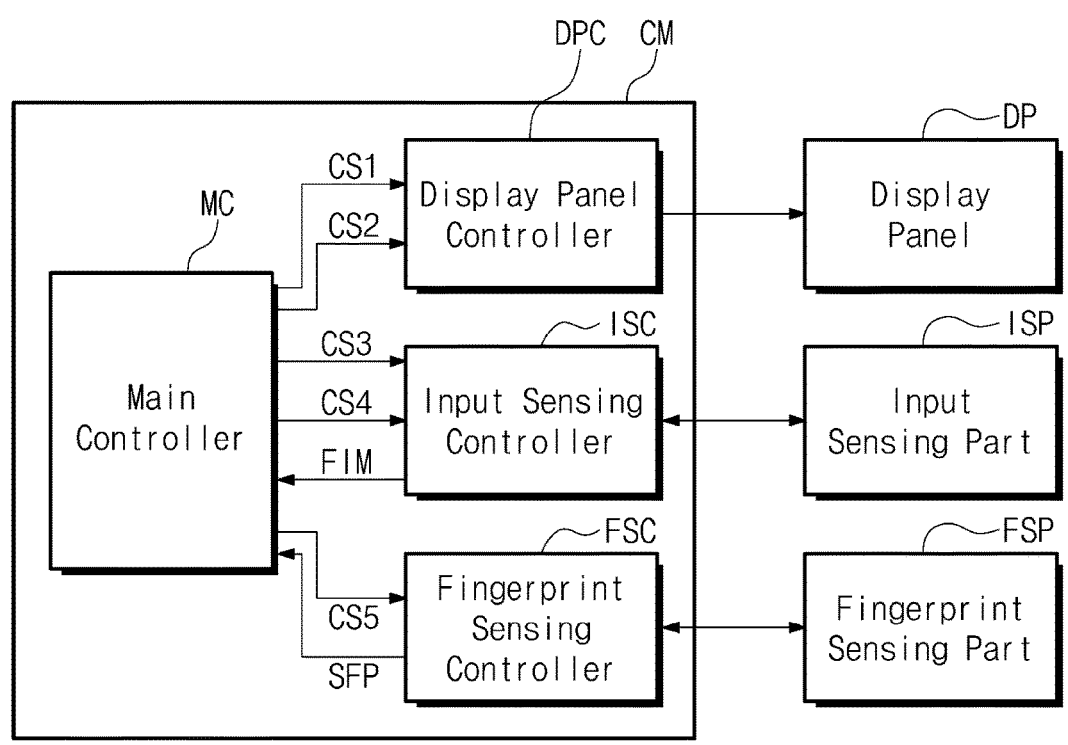
FIG. 9 illustrates a block diagram showing a control module of FIG. 2.
Figure 10:
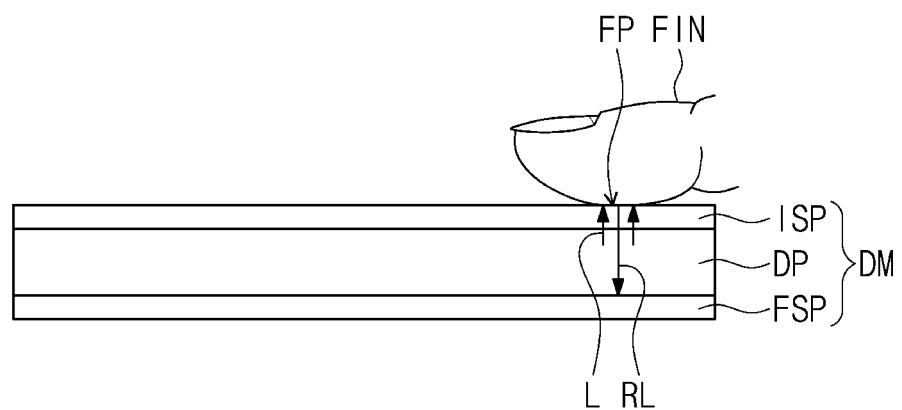
FIG. 10 illustrates a cross-sectional view showing a fingerprint touched on a display module.
Figure 11:
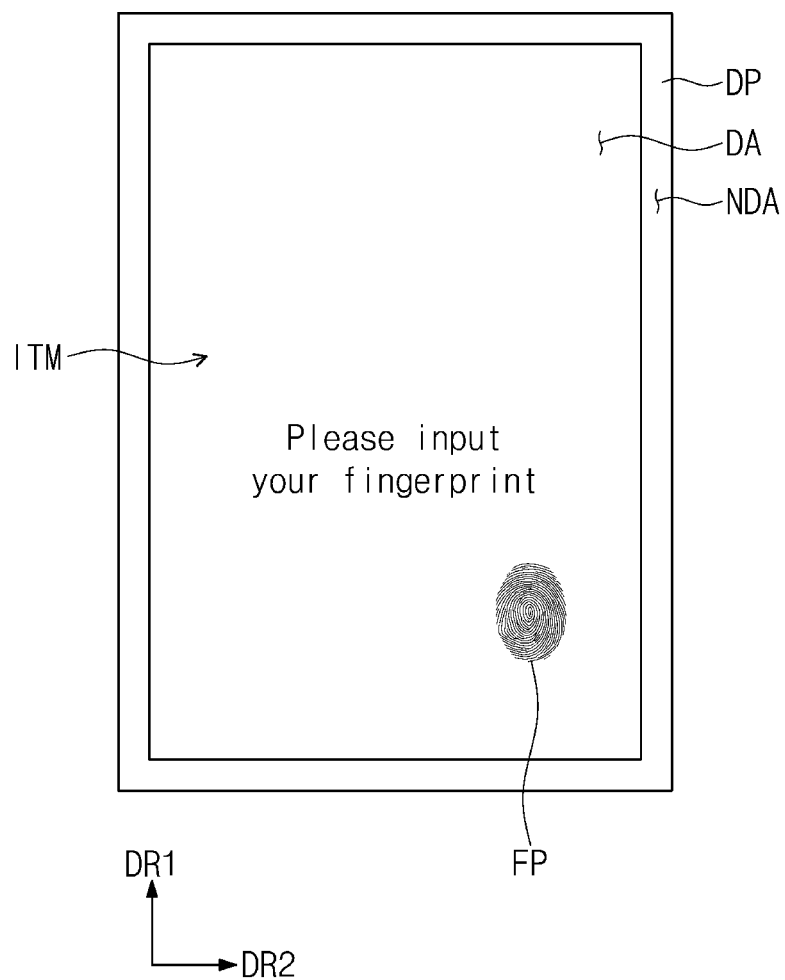
FIG. 11 illustrates a plan view showing a portion where a fingerprint is touched on a plane of the display panel depicted in FIG. 10.
Figure 12:
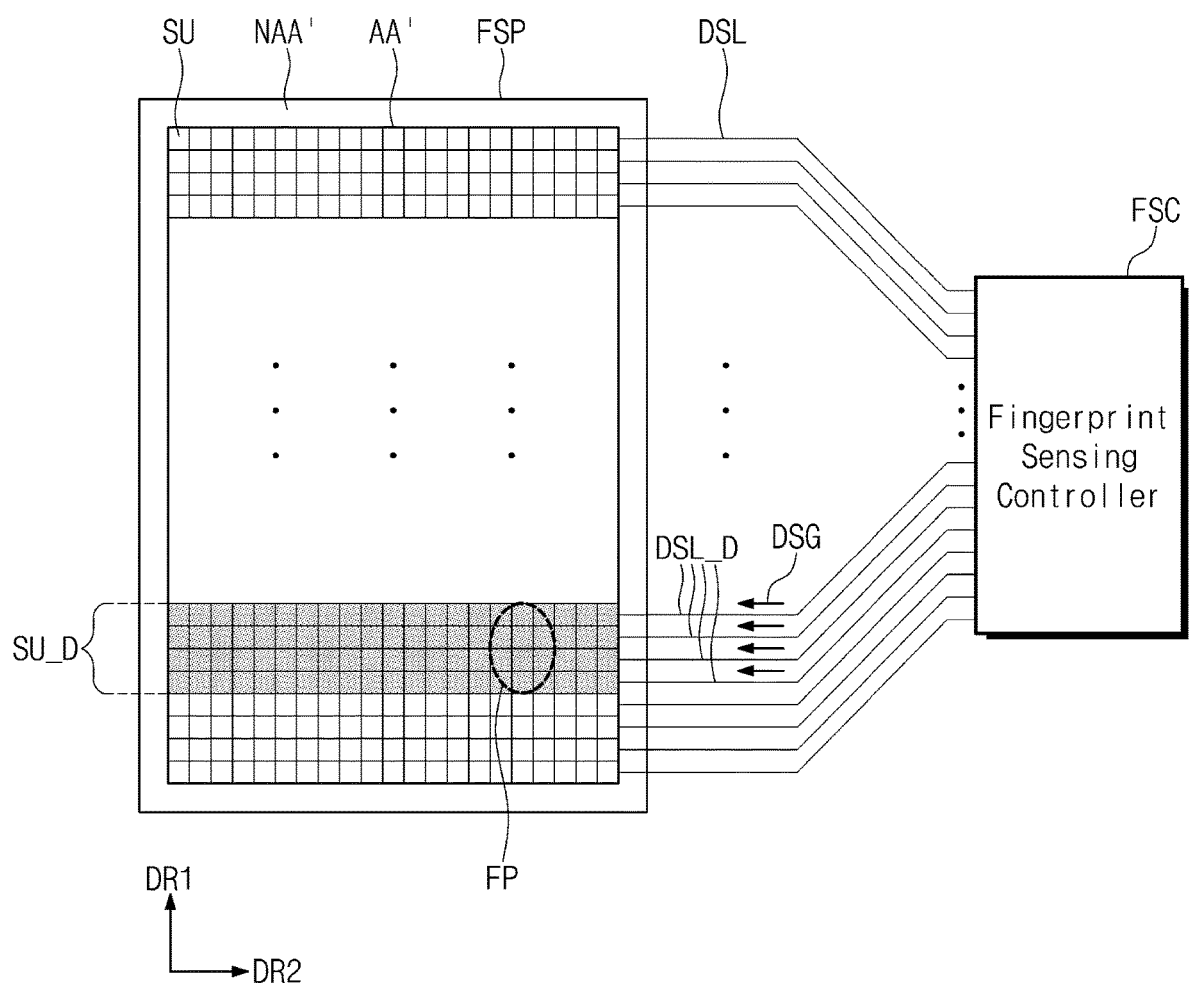
FIG. 12 illustrates a schematic diagram showing a position of the fingerprint of FIG. 11 on a plane of the fingerprint sensing part.

FIG. 9 illustrates a block diagram showing the control module of FIG. 2. FIG. 10 illustrates a cross-sectional view showing a fingerprint touched on the display module. FIG. 11 illustrates a plan view showing a portion where a fingerprint is touched on a plane of the display panel depicted in FIG. 10. FIG. 12 illustrates a schematic diagram showing a position of the fingerprint of FIG. 11 on a plane of the fingerprint sensing part.

Referring to FIGS. 9, 10, and 11, the control module CM may control operations of the display panel DP, the input sensing part ISP, and the fingerprint sensing part FSP. When the display panel DP is driven in the initial mode ITM, the control module CM may drive the input sensing part ISP in the self-sensing mode.

Referring to FIGS. 10 and 11, when a finger FIN touches the input sensing part ISP, the input sensing part ISP may detect a touch of a fingerprint FP of the finger FIN (e.g., the touch of a fingertip of the finger FIN). The self-sensing mode may have touch sensitivity higher than that of the mutual sensing mode. When the fingerprint FP of the finger FIN touches the input sensing part ISP in the self-sensing mode, the touch of the fingerprint FP may be detected, but the present disclosure is not limited thereto. For example, even when the fingerprint FP is in close proximity to the input sensing part ISP without being in contact with the input sensing part ISP, the touch of the fingerprint FP may be detected.

When the input sensing part ISP detects the touch of the fingerprint FP, the control module CM may activate the fingerprint sensing part FSP. The activated fingerprint sensing part FSP may detect the fingerprint FP. For example, the fingerprint FP may be provided with (e.g., may be irradiated by) light L generated from the display panel DP, and the fingerprint sensing part FSP may be provided with (e.g., may receive) reflected light RL reflected from the fingerprint FP. The fingerprint sensing part FSP may use the reflected light RL to detect the fingerprint FP and may provide the control module CM with detected fingerprint information.

When the input sensing part ISP detects the touch of the fingerprint FP, it may be possible to detect a touch position of the fingerprint FP. For example, based on touch information of the fingerprint FP received from the input sensing part ISP, the control module CM may calculate (e.g., may determine) the touch position of the fingerprint FP. Based on information about the touch position of the fingerprint FP, the control module CM may drive a portion of the fingerprint sensing part FSP that overlaps the fingerprint FP. This operation will be discussed below in more detail with reference to FIG. 12.

When the fingerprint information detected from the fingerprint sensing part FSP is coincident with (e.g., matches, substantially matches, or corresponds to) the user's fingerprint information, the control module CM may drive the display panel DP in the main mode from (e.g., after and instead of) the initial mode ITM, and the control module CM may also drive the input sensing part ISP in the mutual sensing mode. The main mode may denote a state where the various images IM are displayed on the display surface DS as illustrated in FIG. 1.

The fingerprint sensing part FSP may include a plurality of optical sensors to use light (e.g., the reflected light RL) to detect the fingerprint FP. Each of the optical sensors may include a photodiode. Although the fingerprint sensing part FSP is illustrated to use light, the fingerprint sensing part FSP may include supersonic (e.g., ultrasound) sensors that use supersonic (e.g., ultrasound) waves to detect the fingerprint FP.

Referring to FIG. 11, because the fingerprint sensing part FSP may be entirely below the display panel DP, the fingerprint FP may be detected at various positions in the display area DA. For example, FIG. 10 shows the detection of the fingerprint FP touched at a right lower portion in the display area DA, but the detection of the fingerprint FP may be achieved when the fingerprint FP is touched at another position in the display area DA.

Referring to FIG. 9, for the operation discussed above, the control module CM may include a main controller MC, a display panel controller DPC that controls an operation of the display panel DP, the input sensing controller ISC that controls an operation of the input sensing part ISP, and a fingerprint sensing controller FSC that controls an operation of the fingerprint sensing part FSP.

When the display device DD is turned on due to the power supply (e.g., due to the power supply module PM illustrated in FIG. 2), the main controller MC may be turned on. The turned-on main controller MC may control operations of the display panel controller DPC, the input sensing controller ISC, and the fingerprint sensing controller FSC. The main controller MC may output first to fifth control signals CS1 to CS5 to control the operations of the display panel controller DPC, the input sensing controller ISC, and the fingerprint sensing controller FSC. For example, in some embodiments, the main controller MC may output the first and second control signals CS1 and CS2 to the display panel controller DPC, may output the third and fourth control signals CS3 and CS4 to the input sensing controller ISC, and may output the fifth control signal CS5 to the fingerprint sensing controller FSC.

In response to the first control signal CS1 received from the main controller MC, the display panel controller DPC may drive the display panel DP in the initial mode ITM. In response to the second control signal CS2 received from the main controller MC, the display panel controller DPC may drive the display panel DP in the main mode.

In response to the third control signal CS3 received from the main controller MC, the input sensing controller ISC may drive the input sensing part ISP in the self-sensing mode. In response to the fourth control signal CS4 received from the main controller MC, the input sensing controller ISC may drive the input sensing part ISP in the mutual sensing mode.

When the main controller MC is turned on, the main controller MC may provide the first control signal CS1 and the third control signal CS3 respectively to the display panel controller DPC and the input sensing controller ISC. When the input sensing part ISP detects the touch of the fingerprint FP, the input sensing controller ISC may calculate (e.g., may determine) information about the touch position of the fingerprint FP based on the touch information about the fingerprint FP. The input sensing controller ISC may provide the main controller MC with calculated position information FIM of the fingerprint FP.

In response to the position information FIM of the fingerprint FP, the main controller MC may provide the fingerprint sensing controller FSC with the fifth control signal CS5. In response to the fifth control signal CS5 received from the main controller MC, the fingerprint sensing controller FSC may activate the fingerprint sensing part FSP and may provide the main controller MC with a detected fingerprint SFP detected from the activated fingerprint sensing part FSP.

The main controller MC may compare the user's fingerprint (e.g., a stored fingerprint of the user) with the detected fingerprint SFP detected from the fingerprint sensing part FSP. When the detected fingerprint SFP is coincident with the user's fingerprint, the main controller MC may provide the second control signal CS2 and the fourth control signal CS4 respectively to the display panel controller DPC and the inputs sensing part ISP.

Referring to FIGS. 9, 10, and 12, the fingerprint sensing part FSP may include an active area AA' and an inactive area NAA'. The active area AA' may overlap the display area DA, and the inactive area NAA' may overlap the non-display area NDA.

The fingerprint sensing part FSP may include a plurality of sensing units SU and a plurality of signal lines DSL connected to the sensing units SU. The signal lines DSL may be connected to the fingerprint sensing controller FSC. Each of the sensing units SU may include an optical sensor.

The sensing units SU may be arranged in a matrix shape. For example, the sensing units SU may be arranged in a plurality of rows along the second direction DR2 and in a plurality of columns along the first direction DR1. Each of the signal lines DSL may be connected to the sensing units SU arranged in a corresponding row among the sensing units SU arranged in the plurality of rows.

In response to the position information FIM of the fingerprint FP received from the input sensing controller ISC, the control module CM may drive a portion of the fingerprint sensing part FSP that overlaps the fingerprint FP. For example, the input sensing controller ISC may provide the main controller MC with the position information FIM of the fingerprint FP, and the main controller MC may generate the fifth control signal CS5 that corresponds to the position information FIM of the fingerprint FP. The fifth control signal CS5 may include driving signals to drive the sensing units SU that overlap the fingerprint FP.

In response to the fifth control signal CS5, the fingerprint sensing controller FSC may drive the sensing units SU that overlap the fingerprint FP. For example, the fingerprint sensing controller FSC may apply driving signals DSG through signal lines DSL_D connected to sensing units SU_D arranged in rows that overlap the fingerprint FP. The sensing units SU_D may be driven by the driving signals DSG that are applied through the signal lines DSL_D, thereby detecting the fingerprint FP.

The fingerprint sensing controller FSC may not apply the driving signals DSG to the signal lines DSL connected to other sensing units SU (e.g., sensing units SU arranged in rows that do not overlap the fingerprint FP). Because the sensing units SU are driven which overlap the fingerprint FP, it may be possible to reduce power consumption. For example, in some embodiments, because only the sensing units SU_D arranged in rows that overlap the fingerprint FP are driven, power consumption may be reduced.

In some embodiments of the present disclosure, when the display panel DP is driven in the initial mode ITM, the input sensing part ISP may be driven in the self-sensing mode having low power consumption, and the fingerprint sensing part FSP is driven at its portion overlapping the fingerprint FP, which may result in reduced power consumption of the display device DD.

Figure 13:
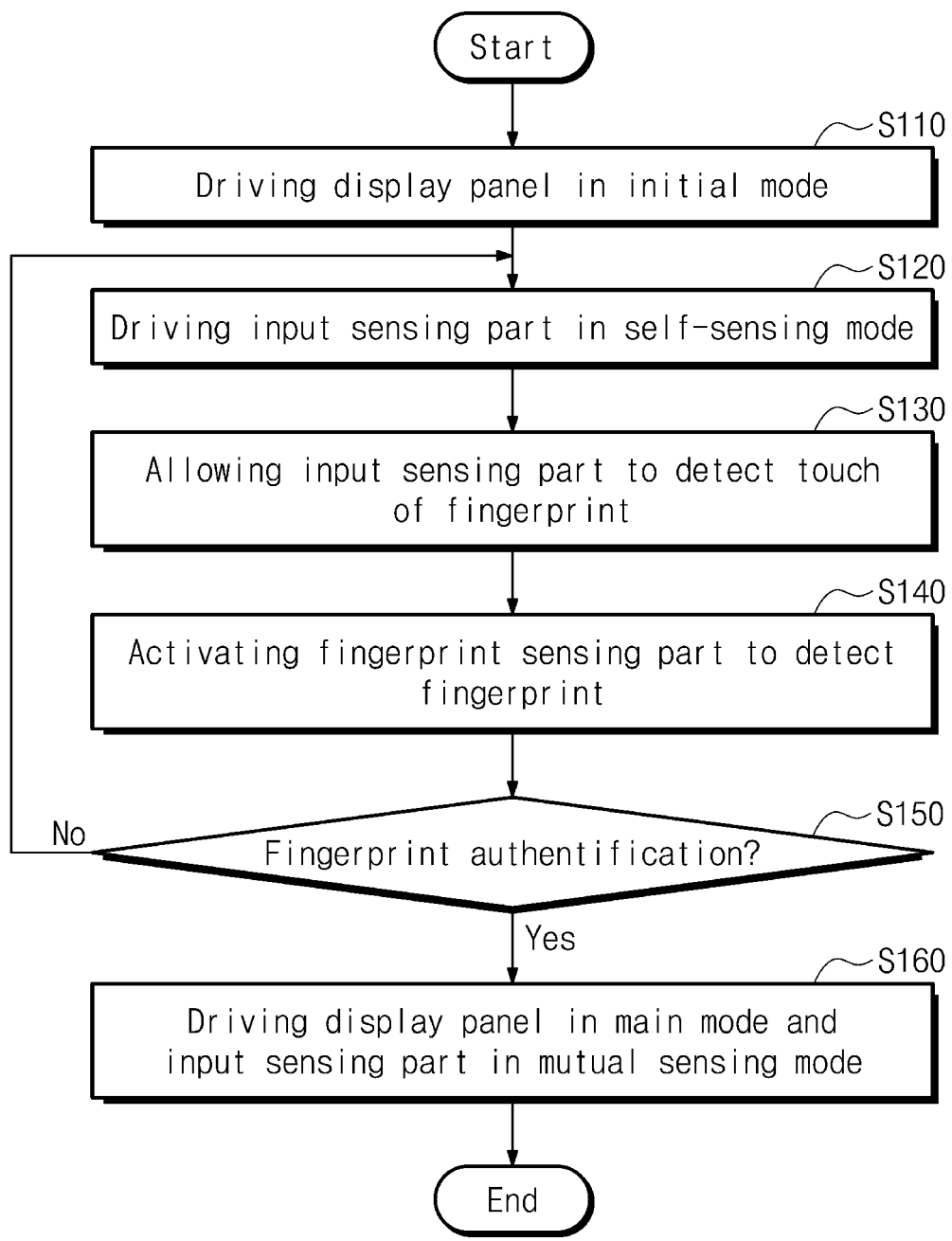
FIG. 13 illustrates a flow chart showing a driving method of a display device according to some example embodiments of the present disclosure.

FIG. 13 illustrates a flow chart showing a driving method of a display device according to some example embodiments of the present disclosure.

Referring to FIG. 13, at a step S110, the display panel DP may be driven in the initial mode. At a step S120, the input sensing part ISP may be driven in the self-sensing mode. At a step S130, the input sensing part ISP may detect the touch of the fingerprint FP. As discussed above, because the touch of the fingerprint FP is detected, the position of the fingerprint FP may be detected. For example, when the touch of the fingerprint FP is detected, the position information FIM of the fingerprint FP may be calculated based on the touch information of the fingerprint FP.

At a step S140, the fingerprint sensing part FSP may be activated to detect the fingerprint FP. As previously mentioned, based on the position information FIM of the fingerprint FP, the fingerprint sensing part FSP may be driven at its portion overlapping the fingerprint FP, and thus the fingerprint FP may be detected.

At a step S150, a fingerprint authentication operation may be performed. For example, when the detected fingerprint SFP obtained in the step S140 is not coincident with the user's fingerprint, the step S120 may be performed. At the step S120, the input sensing part ISP may be driven in the self-sensing mode, and thus the touch of the fingerprint FP may be detected again.

When the detected fingerprint SFP obtained at the step S150 is coincident with the user's fingerprint, then the display panel DP may be driven in the main mode at a step S160, and the input sensing part ISP may be driven in the mutual sensing mode.

According to the aforementioned driving method of the display device DD, when the display panel DP is driven in the initial mode, the input sensing part ISP may be driven in the self-sensing mode, and the fingerprint sensing part FSP is driven at its portion overlapping the fingerprint FP, which may result in reduced power consumption of the display device DD.

Figure 14:
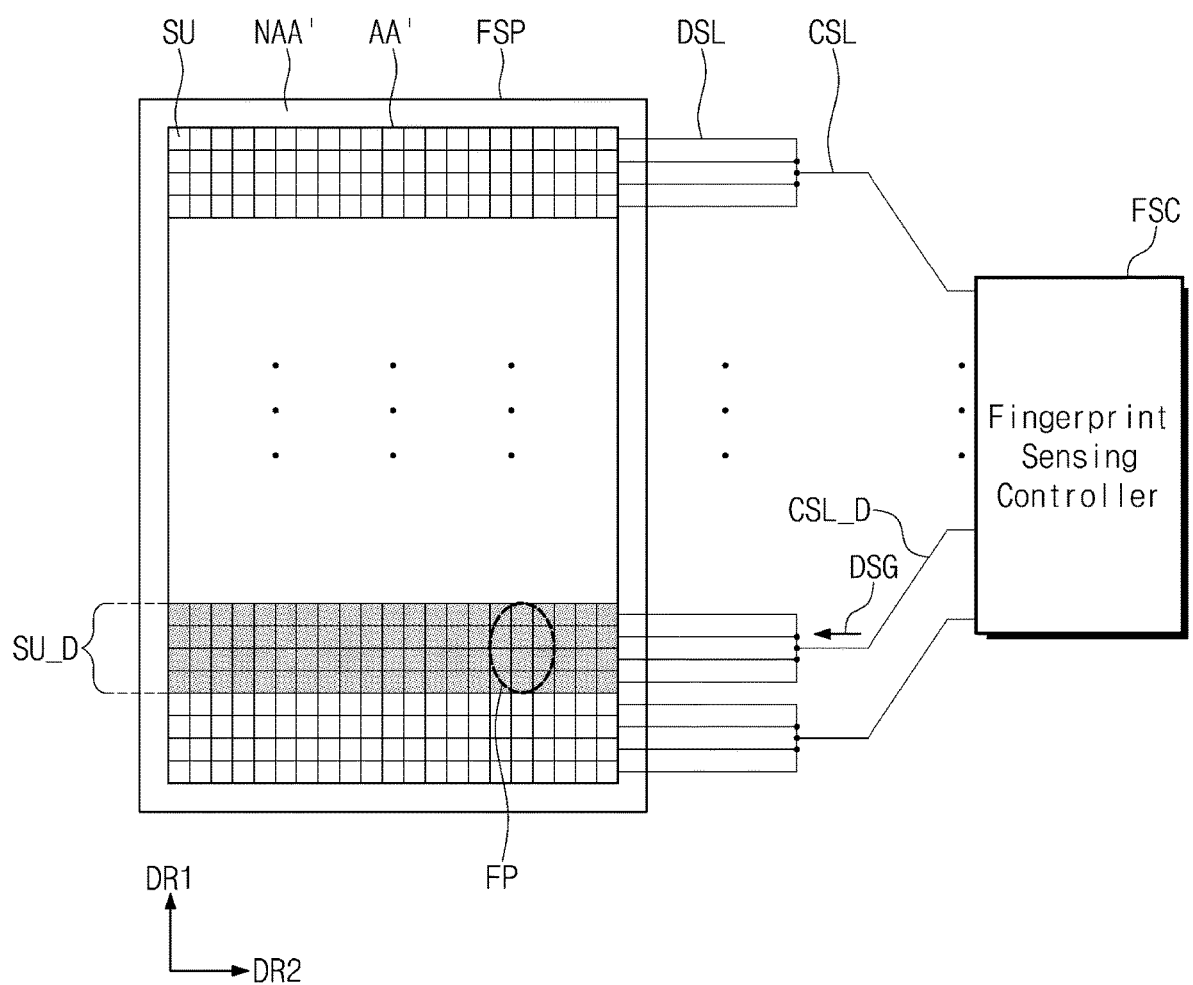
FIG. 14 illustrates a schematic diagram showing a fingerprint sensing part according to some example embodiments of the present disclosure.

FIG. 14 illustrates a schematic diagram showing a fingerprint sensing part according to some example embodiments of the present disclosure.

For convenience of description, FIG. 14 shows a plan view of a fingerprint sensing part that is similar to the fingerprint sensing part of FIG. 12. The differences in the fingerprint sensing part FSP will be described, and redundant descriptions will not be repeated.

Referring to FIG. 14, the fingerprint sensing part FSP may include a plurality of common lines CSL connected to the signal lines DSL. The common lines CSL may be connected to the fingerprint sensing controller FSC. The number of the common lines CSL may be less than that of the signal lines DSL.

In some embodiments, a number h of signal lines DSL may be commonly connected to a corresponding one of the common lines CSL. The number h may be a natural number equal to or greater than 2. The sensing units SU may be connected through the signal lines DSL to the common lines CSL.

Although it is exemplarily illustrated in FIG. 14 that four signal lines DSL are commonly connected to a corresponding one of the common lines CSL (e.g., the number h is 4), embodiments of the present disclosure are not limited thereto.

The sensing units SU_D overlapping the fingerprint FP may be supplied with a driving signal DSG through a common line CSL_D connected to the sensing units SU_D. The use of the common lines CSL may reduce the number of lines connected to the fingerprint sensing controller FSC.

Figure 15:
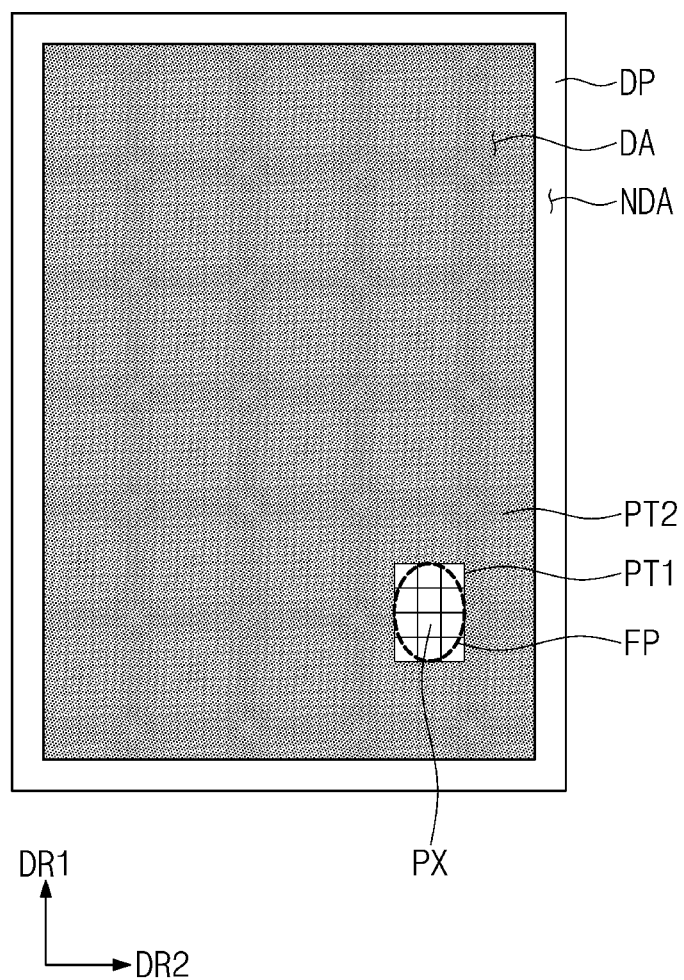
FIG. 15 illustrates a plan view showing an operation of a display device according to some example embodiments of the present disclosure.

FIG. 15 illustrates a plan view showing an operation of a display device according to some example embodiments of the present disclosure.

For convenience of description, FIG. 15 shows a plan view of the display panel DP corresponding to the display panel DP illustrated in FIG. 11. An operation of the display panel DP shown in FIG. 15, together with an operation of the control module CM illustrated in FIG. 9, will be discussed below in more detail.

Referring to FIGS. 9 and 15, in some embodiments where the position of the fingerprint FP is detected when the fingerprint FP is touched on the input sensing part ISP, the display panel DP may be driven at its portion overlapping the fingerprint FP. For example, based on the position information FIM of the fingerprint FP, the main controller MC may provide the display panel controller DPC with a control signal to drive a portion of the display panel DP that overlaps the fingerprint FP.

In response to the control signal provided from the main controller MC, the display panel controller DPC may drive a first part PT1 of the display panel DP and may turn off (e.g., may not drive) a second part PT2 of the display panel DP. The first part PT1 may refer to a part of the display panel DP overlapping the fingerprint FP. The second part PT2 may refer to a part of the display panel DP around the first part PT1. For example, the pixels PX of the first part PT1 may be driven to emit light, and the pixels PX of the second part PT2 may not be driven to emit light.

The light generated from the first part PT1 may be reflected from the fingerprint FP and may then be provided to (e.g., received by) the fingerprint sensing part FSP, and the fingerprint sensing part FSP may detect the fingerprint FP by using the light reflected from the fingerprint FP. Because the display panel DP is driven at its first part PT1 overlapping the fingerprint FP (e.g., at its first part PT1 and not at its second part PT2), the display device DD may have reduced power consumption.

Figure 16:
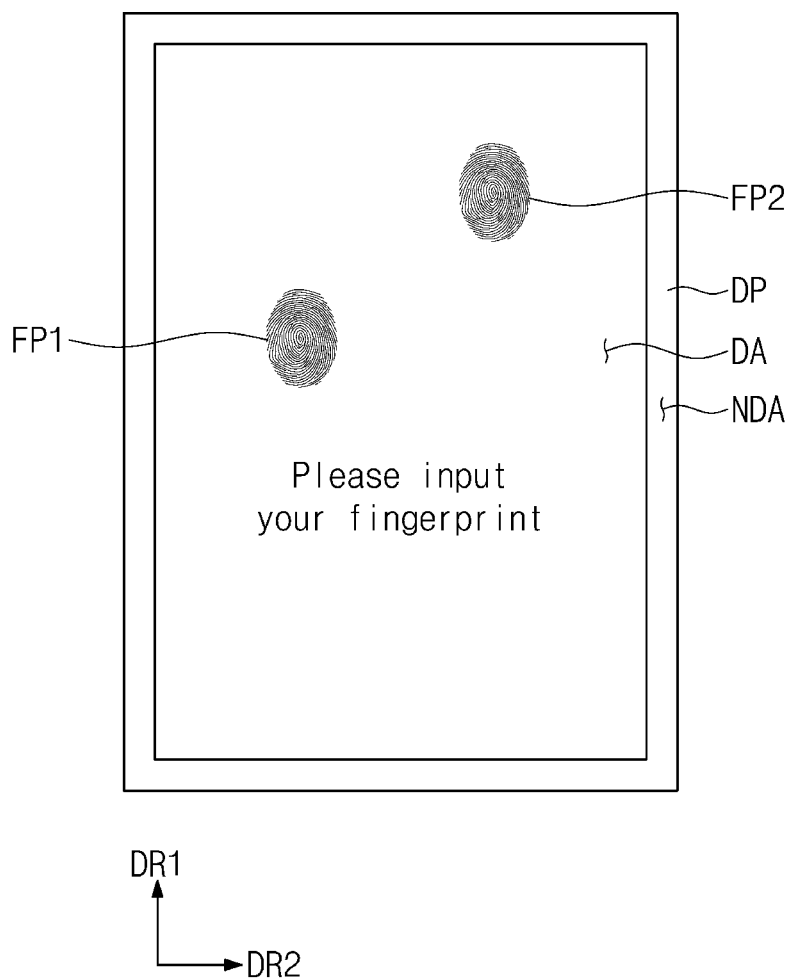
FIG. 16 illustrates a plan view showing an operation of a display device according to some example embodiments of the present disclosure.

FIG. 16 illustrates a plan view showing an operation of a display device according to some example embodiments of the present disclosure.

For convenience of description, FIG. 16 shows a plan view of the display panel DP corresponding to the display panel DP illustrated in FIG. 11.

Referring to FIG. 16, a plurality of fingerprints FP1 and FP2 may touch the display panel DP in the initial mode ITM. Although some embodiments illustrated in FIG. 16 illustrate that the plurality of fingerprints FP1 and FP2 includes two fingerprints, embodiments are not limited thereto, and the plurality of fingerprints may include any suitable number of fingerprints. As discussed above, because the fingerprint sensing part FSP is entirely below the display panel DP (e.g., below the entire display panel DP), the fingerprints FP1 and FP2 may be detected together at various positions in the display area DA. Because the method of detecting the fingerprints FP1 and FP2 is the same as the method of detecting the fingerprint FP discussed above, repetitive descriptions will not be repeated.

Enhanced security may be provided when an authentication operation is performed on a plurality of fingerprints FP1 and FP2 rather than on a single fingerprint.

According to some embodiments of the present disclosure, when a display panel is driven in an initial mode, an input sensing part may be driven in a self-sensing mode having low power consumption, and a fingerprint sensing part is driven at its portion overlapping a fingerprint, which may reduce the display device's power consumption.

Although the present disclosure is described in conjunction with some example embodiments thereof, it should be understood by those of ordinary skill in the art that the disclosed embodiments of the present disclosure can be modified or changed in various ways without departing from spirit and scope of the present disclosure defined by the appended claims. Further, the embodiments disclosed herein are not intended to limit the technical spirit of the present disclosure and the technical spirit within the claims and their equivalents should be construed as being included in the present disclosure.

What is claimed is:

1. A driving method of a display device, the driving method comprising:
    driving a display panel in an initial mode;
    driving an input sensing part in a self-sensing mode during the driving of the display panel in the initial mode;
    detecting a touch of a fingerprint by the input sensing part;
    controlling a fingerprint sensing part to detect the fingerprint;
    driving the display panel in a main mode in response to determining that a detected fingerprint is coincident with stored fingerprint information; and
    driving the input sensing part in a mutual sensing mode in response to the determining that the detected fingerprint is coincident with the stored fingerprint information,
    wherein based on position information of the fingerprint, a first part of the display panel is driven and a second part of the display panel is not driven, the first part overlaps the fingerprint, and the second part is around the first part.

2. The driving method of claim 1, wherein
    detecting the touch of the fingerprint includes calculating the position information of the fingerprint based on touch information of the fingerprint, and
    controlling the fingerprint sensing part includes driving a portion of the fingerprint sensing part based on the position information of the fingerprint, the portion of the fingerprint sensing part overlapping the fingerprint.

3. The driving method of claim 2, wherein the fingerprint sensing part includes:
    a plurality of sensing units arranged in a plurality of rows and in a plurality of columns; and
    a plurality of lines connected to the sensing units,
    wherein each line of the plurality of lines is connected to sensing units arranged in a corresponding row, and
    driving the portion of the fingerprint sensing part includes applying a plurality of driving signals to a first group of the plurality of lines that are connected to a first group of sensing units that overlap the fingerprint.

4. The driving method of claim 3, wherein the fingerprint sensing part further includes a plurality of common lines connected to the lines,
    wherein a second group of the plurality of lines are connected in common to a corresponding common line, the second group of lines being connected to a second group of sensing units arranged in h number of rows, wherein h is a natural number equal to or greater than 2.

5. The driving method of claim 1, wherein detecting the fingerprint includes detecting a plurality of fingerprints.

6. The driving method of claim 1, wherein the input sensing part includes:
    a first sensing electrode; and
    a second sensing electrode that is insulated from the first sensing electrode and crosses the first sensing electrode,
    wherein, when the input sensing part is driven in the self-sensing mode, the first sensing electrode is operated as a driving electrode and as a sensing electrode, and
    wherein, when the input sensing part is driven in the mutual sensing mode, the first sensing electrode is operated as the driving electrode and the second sensing electrode is operated as the sensing electrode.

7. The driving method of claim 1, wherein the fingerprint sensing part includes an optical sensor or a supersonic sensor.

* * * * *